United States Patent
Najafi et al.

(10) Patent No.: US 7,280,799 B1
(45) Date of Patent: Oct. 9, 2007

(54) MOBILE PHONE REPEATER

(75) Inventors: Hamid Najafi, Los Altos Hills, CA (US); Fred Judson Heinzmann, Los Altos, CA (US)

(73) Assignee: Broadlink Research Inc., Danville, CA (US)

( * ) Notice: Subject to any disclaimer, the term of this patent is extended or adjusted under 35 U.S.C. 154(b) by 603 days.

(21) Appl. No.: 10/921,548

(22) Filed: Aug. 18, 2004

(51) Int. Cl.
*H04B 7/15* (2006.01)
(52) U.S. Cl. ............. 455/11.1; 455/16; 455/67.11; 455/562.1; 455/422.1; 455/561; 455/232.1; 455/115.1; 455/127.2; 343/727; 343/729; 343/794
(58) Field of Classification Search .......... 455/571, 455/15–17, 13.4, 11.1, 9, 67.11, 562.1, 424, 455/422.1, 503, 561, 296, 258, 263, 355, 455/115.1, 232.1, 230, 239.1, 240.1, 127.2; 343/770, 767, 727, 729, 793, 795
See application file for complete search history.

(56) References Cited

U.S. PATENT DOCUMENTS

| | | | |
|---|---|---|---|
| 6,009,324 A | * | 12/1999 | Pravitz et al. .............. 455/423 |
| 6,993,287 B2 | * | 1/2006 | O'Neill .................... 455/11.1 |
| 7,009,573 B2 | * | 3/2006 | Hornsby et al. ............ 343/770 |
| 7,209,703 B1 | * | 4/2007 | Yarkosky ..................... 455/9 |
| 2004/0110469 A1 | * | 6/2004 | Judd et al. ................... 455/15 |
| 2004/0235417 A1 | * | 11/2004 | Dean .......................... 455/10 |
| 2005/0118949 A1 | * | 6/2005 | Allen et al. ............... 455/13.4 |
| 2005/0272367 A1 | * | 12/2005 | Rodgers et al. ........... 455/11.1 |

FOREIGN PATENT DOCUMENTS

GB        2258586       * 2/1993

* cited by examiner

*Primary Examiner*—Matthew Anderson
*Assistant Examiner*—Sujatha Sharma
(74) *Attorney, Agent, or Firm*—Aaron Wininger; Thelen Reid Brown Raysman & Steiner

(57) ABSTRACT

A wireless communication device repeater includes two antennas coupled to a bi-directional gain stage. A gain control system is coupled to the gain stage and adjusts the gain of the gain stage based on oscillation events.

26 Claims, 4 Drawing Sheets

MOBILE PHONE REPEATER

TECHNICAL FIELD

This invention relates generally to mobile phone repeaters, and more particularly, but not exclusively, provides a mobile phone repeater with dual internal antenna and method of use thereof.

BACKGROUND

Cellular phones (also referred to interchangeably as mobile phones) and other wireless communication devices have become very popular in the last few years. One challenge is for cellular phone carriers to provide a complete coverage of the areas where users are. This can be done by installing more base stations (cell sites). In areas where users are sparse, the carriers may not be able to justify the cost of installing a cell site. The carriers may also face problems of acquiring an antennae location due to local regulations or community opposition. Even with cell sites nearby, it is not uncommon to have certain "dead spots" in certain locations, where wireless coverage is not adequate for a reliable connection.

A number of products have been manufactured to address this problem. Some are designed to extend the wireless coverage in tunnels, underground parking garages, or subways. They consist of multiple parts including directional antennas, cables, repeater boxes, and other external antennas.

A few companies sell cellular repeaters for homes and offices but these units also consist of an outdoor antenna connected via coaxial cable to an amplifier unit, which in turn connects to an indoor antenna. These units are not easy to install and typically cost several hundred dollars. The two antennae in these units must be kept apart to avoid instability and oscillation due to signal feedback from one antenna to the other.

Accordingly, a new repeater and method of use thereof are required that are easy to install and cost effective.

SUMMARY

In order to achieve ease of installation and simplicity for the end user, embodiments of the invention integrate two antennae into a single enclosure so that no outside wiring (except for a power cord) is needed. Maximum repeater performance is achieved by having the maximum possible isolation between receive and transmit antenna elements. This allows the maximum possible gain to be utilized in the transmit path.

Embodiments minimize antennae coupling by utilizing low profile back-to-back patch elements with orthogonal polarizations. More than 50 dB of local isolation can be achieved with this method. Further, the orthogonal antenna elements help reduce coupling due to spectral scattering within the local operating environment.

Embodiments minimize repeater oscillation by utilizing a smart, adaptive gain control system to throttle the circuit gain to prevent oscillations. The environment around the repeater is dynamic, that is it can change due to the location of people, objects, and the repeater itself. This changing environment can change the effective isolation between the antennas. The adaptive control system continuously monitors repeater stability and attempts to set the maximum possible gain, for best performance, while avoiding oscillations.

Embodiments eliminate local amplifier instability by utilizing balanced signal paths around the main gain block, which allows the use of signal cancellation techniques. This allows the main gain block to have a maximal amount of gain while maintaining local amplifier stability.

Embodiments of the invention reduce cost by utilizing a single gain block for both the uplink and downlink paths. A frequency division duplexed (FDD) link requires repeater gain in two closely spaced frequency bands, one for the uplink and one for the downlink. The present design eliminates the need for a second gain block by using the same gain block for both bands by making maximum usage of mobile phone duplexers.

Cost is further reduced by eliminating expensive RF connectors by utilizing a low-cost EMI clip along with an impedance matching network. For performance reasons the antenna structure is separate from the printed circuit board (PCB) assembly. Typically this connection is made with expensive RF connectors and cable assemblies. The present design eliminates substantially all cables and connectors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
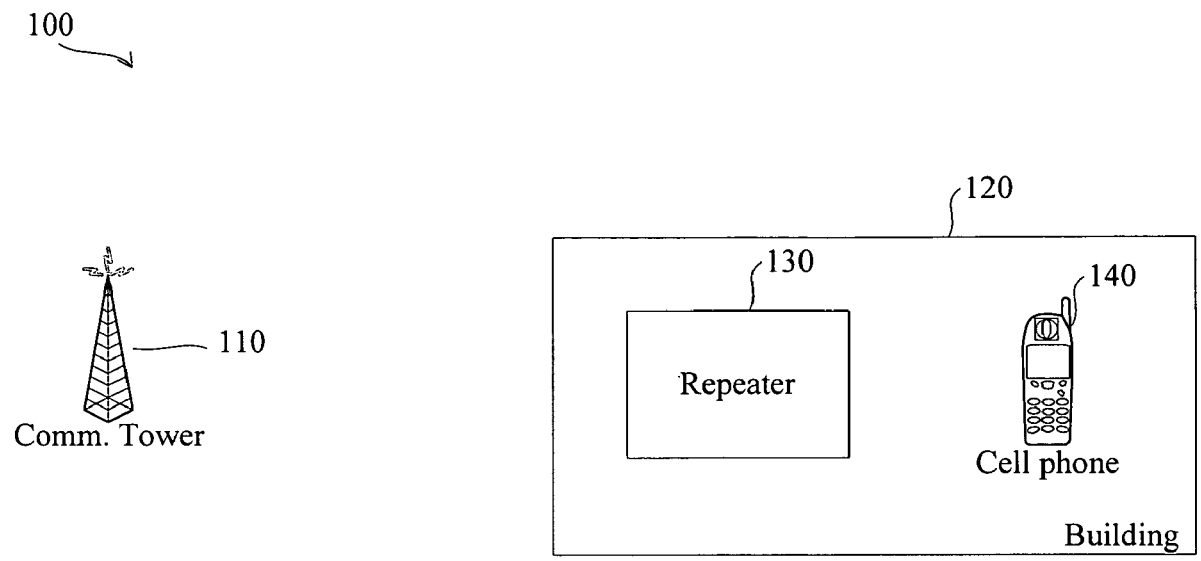
FIG. 1 is a block diagram illustrating a network system according to an embodiment of the invention.

FIG. 1 is a block diagram illustrating a network system 100 according to an embodiment of the invention. The network system 100 comprises a communication tower 110 (which is being used generically herein to include a base station and/or other wireless signal source) communicatively coupled via wireless signals to a repeater 130 in a building 120. The repeater 130 is communicatively coupled via wireless signals to the cell phone 140. The repeater 130 amplifies both the cell phone 140 signals and the communication tower 110 signals. Without the repeater 130, the cell phone 140 may not be able to communicate with the communication tower 110.

Figure 2:
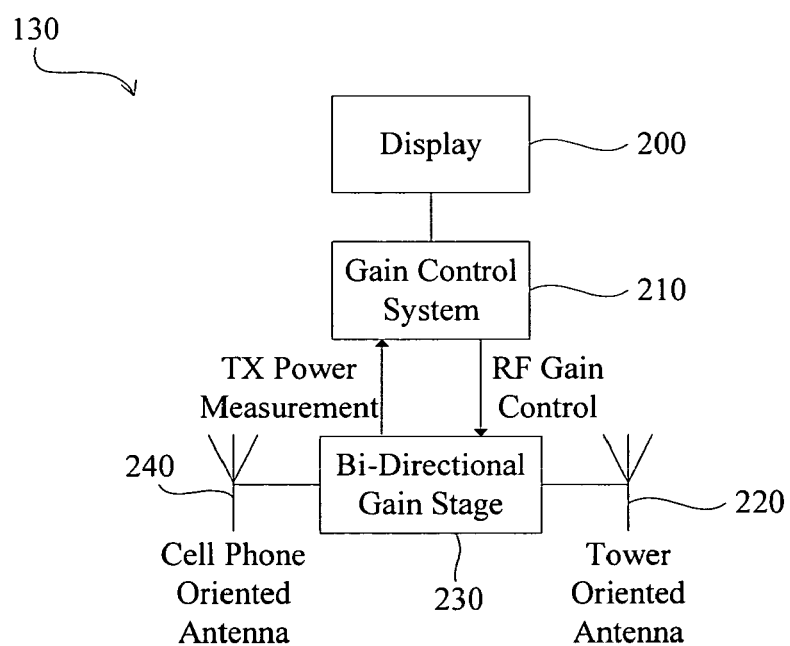
FIG. 2 is a block diagram illustrating a repeater of the network system.

FIG. 2 is a block diagram illustrating the repeater 130 of the network system 100. The repeater addresses the problem of poor signal coverage by amplifying the signals received from the communications tower 110 as well as the signals transmitted by the mobile phone 140, in a self contained, small housing that sits on a desktop and does not have any external antennae or wiring, except for a power cord.

The repeater 130 has two built-in directional antennae, one for the communications tower 110 signal and one for the mobile phone 140 signal, designed to have maximum isolation to minimize oscillations due to regenerative feedback. The signal gain in each direction is controlled by a gain control system 210 that detects oscillations and throttles the amplifiers' gain to maintain maximum signal gain while preventing undesired oscillation.

An embodiment of the invention also uses a unique circuit design that shares the components in a transmit path and a receive path to keep the overall cost down. In an embodiment of the invention, the repeater 130 utilizes the antenna feed in each direction to maximize isolation between the two antennae without additional components, thus helping keep the cost of the repeater 130 down.

The repeater 130 comprises a display 200 communicatively coupled to a gain control system 210, which is communicatively coupled to a bi-directional gain stage 230, which is communicatively coupled to both a tower oriented antenna 220 and a cell phone oriented antenna 240.

The display 200 includes a placement warning indicator and a status indicator (see FIG. 7) that display indications based on feedback from the gain control system 210. The placement warning indicator displays a warning when the repeater 130 cannot adequately amplify a signal. The status indicator indicates when the repeater 130 is operating.

The gain control system 210 controls adjusts the gain of the bi-direction gain stage 230, which amplifies both mobile phone 140 signals and communication tower 110 signals. After amplification of signals, the amplified signals are transmitted over the antennas 220 and 240.

Performance of the repeater 130 is directly related to the maximum amount of stable duplexed gain that can be placed between antennas 220 and 240. Conventionally, a simple fixed gain design would require that the gain be limited to a level that is guaranteed to ensure stability under all possible deployment conditions and thus would result, on average, in a product with highly compromised performance characteristics. In contrast, the 130 uses an aggressively high level of duplexed gain along with an adaptive stability monitoring loop executed by the gain control system 210 that actively reduces the repeater 130 gain only when necessary (e.g., due to oscillation between the antennas 220 and 240).

In an embodiment of the invention, the gain control system 210 comprises a simple low cost single chip micro controller, which has two analog interface points into the radio frequency (RF) hardware, that runs a gain control algorithm. A first analog signal is an input that ranges from approximately +4.0V down to 0V and indicates the current composite average RF power level being transmitted from the repeater 130. The slope of this signal is inverted such that at low power levels the voltage will 'hover' around 4.0V. As the power level increases the detected voltage decreases. At maximum rated RF power the voltage will just hit 0V. When the repeater 130 goes unstable this voltage will rail at 0V and so we will use a numeric threshold that equates to 0.5V as the oscillation or instability decision criteria. 0.5V on the detector is the point at which the gain stage 230 is operating at approximately +27 dBm, which is its useable upper limit in an embodiment of the invention. The response time of this detector is less than 100 μsec. An 8-bit A/D converter built in to the micro-controller is used for the threshold monitoring function.

The second analog signal is an output that must range from 3.0V down to 0.6V and is used to control the RF gain of the repeater 130. The gain control element has relatively good log conformance and has the approximate transfer characteristic:

RelativeGain_dB($V_{control}$)=12.5*$V_{control}$−28.0 for 0.6V≦$V_{control}$≦2.6V.

When the control algorithm determines that the repeater 130 can operate at maximum gain, $V_{control}$ should be set to 3.0V. An embodiment of the invention uses a pulse width modulator (PWM) that is built into the micro-controller. It is clocked at 8 MHz with and has programmable period/resolution registers. In order to maximize clock frequency rejection, for a given response time, the resolution should be no more than necessary. This will maximize the clock frequency for a given single pole filter cut-off frequency. The current filter has a cut-off of 400 Hz, which implies an RC time constant of 400 usec. A PWM resolution of 6-bits will give a PWM output frequency of 125 kHz, which should represent a reasonable balance between control resolution and clock frequency. The PWM output has been scaled to 3.0V DC full-scale and thus the control resolution will be 47 mV/LSB, which equates to approximately 0.6 dB/LSB of gain resolution.

The main cause of conventional repeater instability is undesired coupling between the base and mobile side antennas. RF scattering in the local environment is the predominant source of this coupling. The gain control system 210 uses a gain control algorithm intended to enable the repeater 130 to operate at the maximum possible gain while simultaneously minimizing the duration of an oscillation event and maintaining the oscillation event rate below a set level. Doing this involves a fast attack, slow decay gain back-off inner loop and a much slower event rate monitoring outer loop.

The cell phone oriented antenna 240 and the tower oriented antenna 220 are of a substantially identical design and comprise linearly polarized double tuned patch elements. The double tuned design provides a good impedance match, high efficiency, and high directive gain across a full PCS radio band. The elements are each canted 45-degrees relative to the ground, and in opposite directions thus making their polarizations orthogonal. The orthogonal polarization helps reduce direct antenna coupling as well as spectral scattering in the user environment. This, in turn, improves the effective antenna-to-antenna isolation thus enabling the repeater 130 to operate with higher gain.

Figure 3:
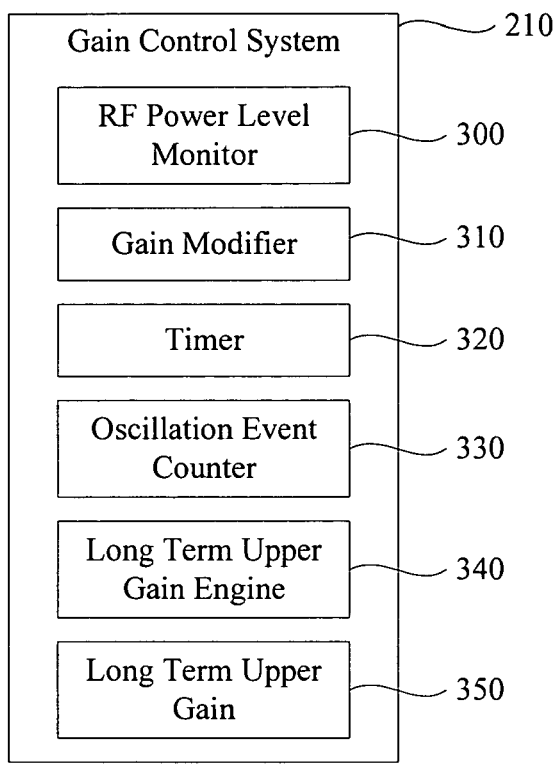
FIG. 3 is a block diagram illustrating a gain control system of the repeater.

FIG. 3 is a block diagram illustrating the gain control system 210. The gain control system 210 comprises an RF power lever monitor 300; a gain modifier 310; a timer 320; an oscillation event counter 330; a long term upper gain engine 340 and a long term upper gain setting 350.

Specifically, the gain control system 210 executes a gain control algorithm, comprising:

1) The RF power level monitor 300, running continuously, monitors the RF power level. If the power level exceeds a threshold (detector voltage drops below 0.5V), the gain modifier 310 reduces the RF gain by about a 2.4 dB step. Gain reduction continues to check every 1 ms through the cycle until the monitor 300 indicates that oscillation has stopped (detector voltage rises above 0.5V). Each time the repeater 130 gain is reduced is counted as an oscillation event by the oscillation event counter 330. This is the fast attack characteristic.

2) If the oscillation has ceased for more than 10 seconds (as indicated by the timer 320) the gain modifier 310 increases the repeater 130 gain by about 0.6 dB (one LSB on the PWM). This process continues until the repeater gain reaches the long-term upper gain limit set by the long term upper gain engine 340. This is the slow decay characteristic.

3) Every time there is an oscillation event, as described in the preceding, the oscillation event counter 330 is incremented. The long-term upper gain (LTUG) engine 350 increments or decrements the long term upper gain 350 by about 1.2 dB depending on the accumulated oscillation event counter value during a 5-minute observation window. If the oscillation event counter 330 is 0 (that is there were no observed oscillations) within the 5-minute observation window the LTUG engine 340 increments the LTUG 350 by about 1.2 dB. If the oscillation event counter 330 is 1 within the 5-minute observation window then the TUG engine 340 leaves the LTUG 350 unchanged. If the event counter reaches 2 (i.e. there are 2 or more events within the 5-minute window) then the LTUG engine 340 decrements the LTUG 350 by 1.2 dB and the oscillation event counter 330 and 5-minute counter values are reset to zero. If the LTUG 350 reaches the repeater absolute gain maximum (RelativeGain_dB($V_{control}$)=0 or $V_{control}$=2.6V) then Vcontrol is set to 3.0V. This is the event rate monitoring outer loop.

Figure 4:
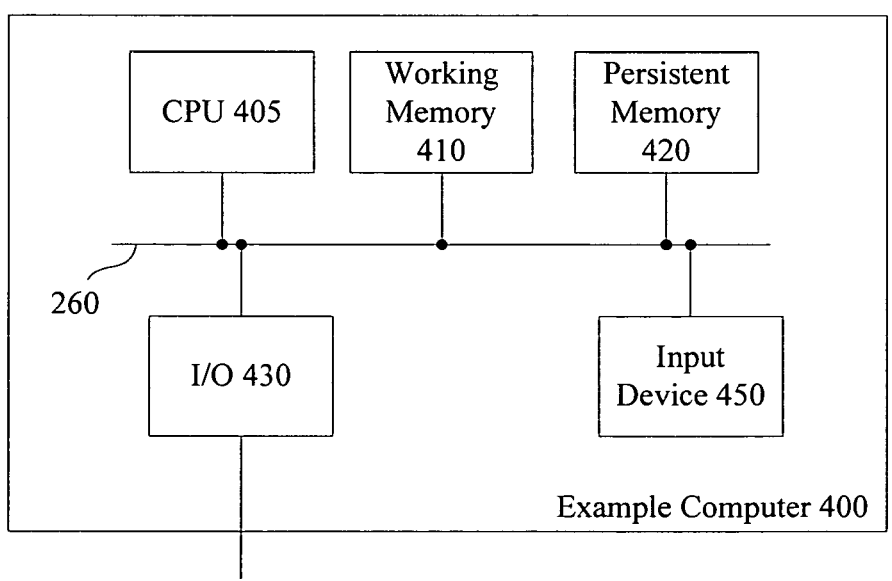
FIG. 4 is a block diagram illustrating an example computer capable of hosting the gain control system.

FIG. 4 is a block diagram illustrating an example computer 400 capable of hosting the gain control system 210. The example computer 400 includes a central processing unit (CPU) 405; working memory 410; persistent memory 420; input/output (I/O) interface 430; and input device 450, all communicatively coupled to each other via a bus 460. The CPU 405 may include an INTEL PENTIUM microprocessor, a Motorola POWERPC microprocessor, a PIC16F818 microprocessor, or any other processor capable to execute software (e.g., the gain control system 210 components) stored in the persistent memory 420. The working memory 410 may include random access memory (RAM) or any other type of read/write memory devices or combination of memory devices. The persistent memory 420 may include a hard drive, read only memory (ROM) or any other type of memory device or combination of memory devices that can retain data after the example computer 400 is shut off. The I/O interface 430 is communicatively coupled, via wired or wireless techniques, to the bi-direction gain stage 230 and the display 200. The input device 450, which is optional like other components of the invention, may include a keyboard, mouse, or other device for inputting data, or a combination of devices for inputting data.

One skilled in the art will recognize that the example computer 400 may also include additional devices, such as network connections, additional memory, additional processors, LANs, input/output lines for transferring information across a hardware channel, the Internet or an intranet, etc. One skilled in the art will also recognize that the programs and data may be received by and stored in the system in alternative ways. Further, in an embodiment of the invention, an ASIC is used in placed of the computer 400 to perform the functions of the gain control system 210.

Figure 5:
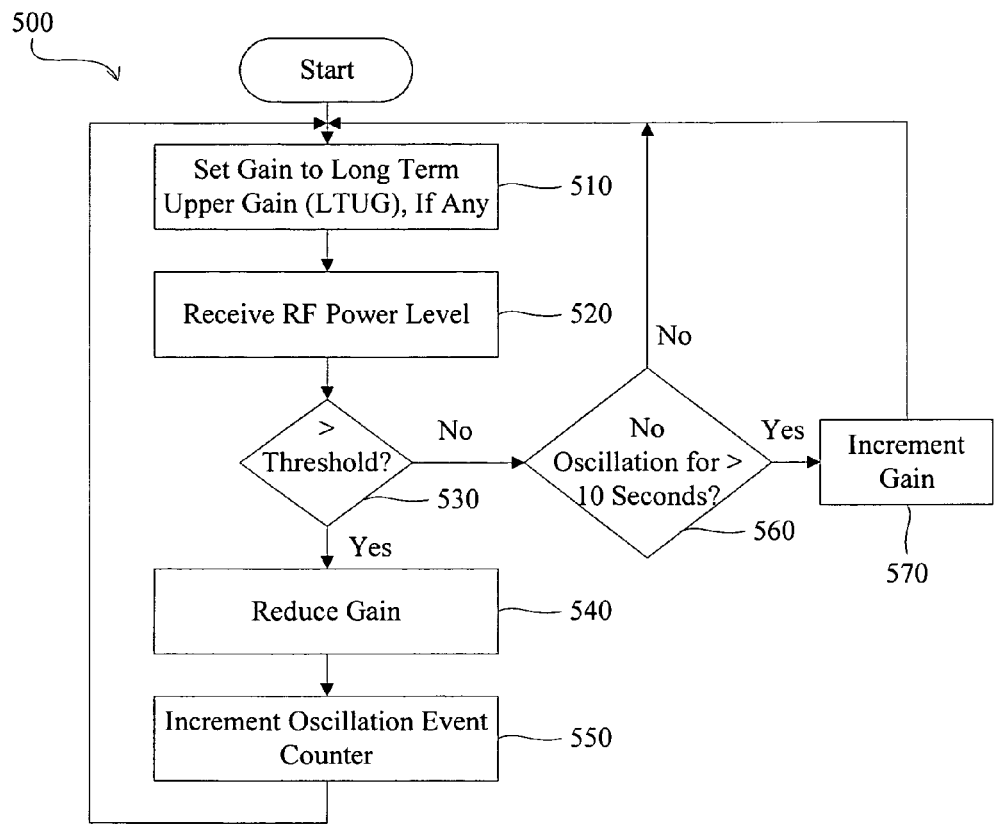
FIG. 5 is a flowchart illustrating a method of adjusting gain in the repeater.

FIG. 5 is a flowchart illustrating a method 500 of adjusting gain in the repeater 130. In an embodiment of the invention, the gain control system 210 executes the method 500. First, the gain is set (510) to the maximum LTUG. Next, a RF power level measurement is received (520). If (530) it exceeds a threshold (e.g., voltage <about 0.5 V indicating an oscillation event), then the gain is reduced (540) (e.g., by about 2.4 dB). An oscillation event counter (e.g., the counter 330) is incremented (550) and the method 500 repeats. If (530) the power measurement does not exceed a threshold, then if (560) there has been no oscillation event for more than 10 seconds, then the gain is incremented (570) (e.g., by about 0.6 dB). The method 500 then repeats. If (560) there has been an oscillation event, then the method 500 repeats without incrementing (570) the gain. The method 500 repeats continuously until the repeater 130 is powered off.

Figure 6:
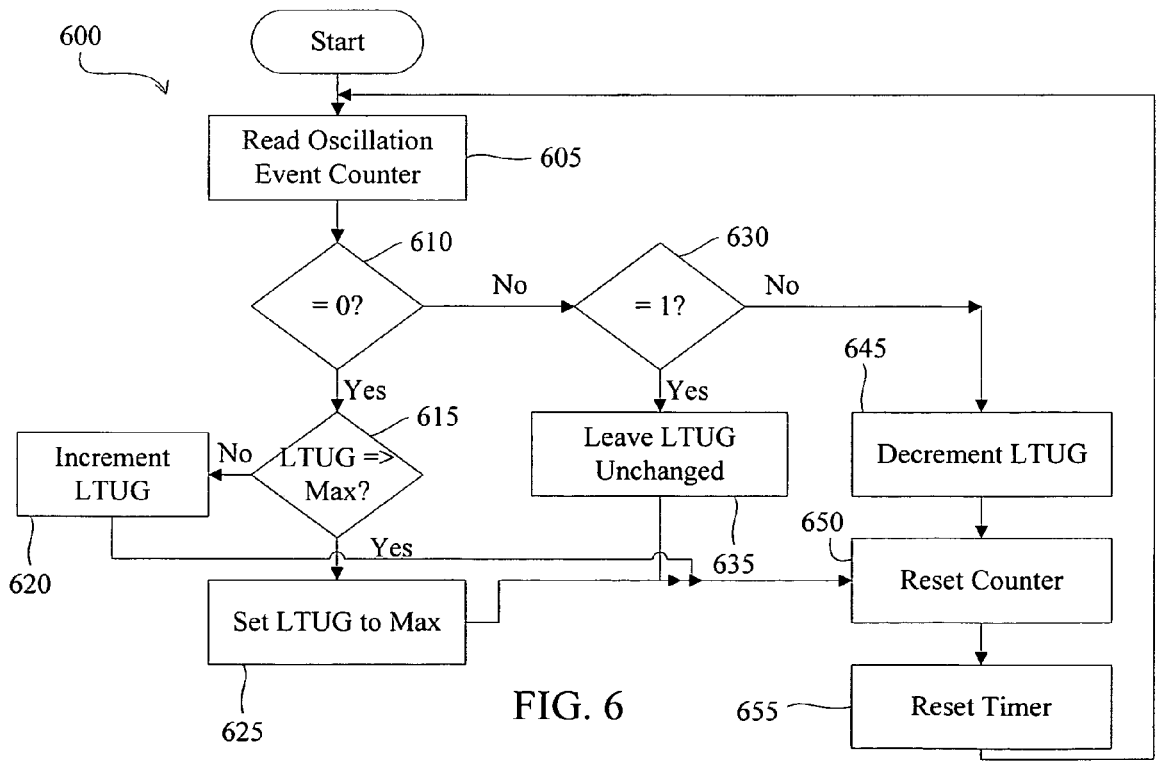
FIG. 6 is a flowchart illustrating a method of adjusting a long term upper gain in the repeater.

FIG. 6 is a flowchart illustrating a method 600 of adjusting a long term upper gain in the repeater 130. In an embodiment of the invention, the gain control system 210 executes the method 500 repeatedly about every 5 minutes. First, an oscillation event counter (e.g., the counter 330) is read (605). If (610) the counter is set to 0 indicating no oscillation events and the LTUG 350 is greater or equal to a maximum value. Otherwise, if (615) the LTUG is less than the maximum, then the LTUG is incremented (620) (e.g., by 1.2 dB). The oscillation event counter is then reset (650) as is the timer (655). The method 600 then repeats after 5 minutes (as measured by the timer 320).

If (610) the oscillation event counter is not equal to zero but instead is equal to 1 (630), then the LTUG is left (635) unchanged, the counter is reset (650) and is the timer (655). The method 600 then repeats after 5 minutes. If (630) the oscillation event counter is not equal to 1, then it must be equal or greater than 2 and the LTUG is decremented (645) by, e.g., 1.2 dB. The counter is then reset (650) as is the timer (655). The method 600 then repeats after 5 minutes. The method 600 repeats every 5 minutes until the repeater 130 is powered off.

Figure 7:
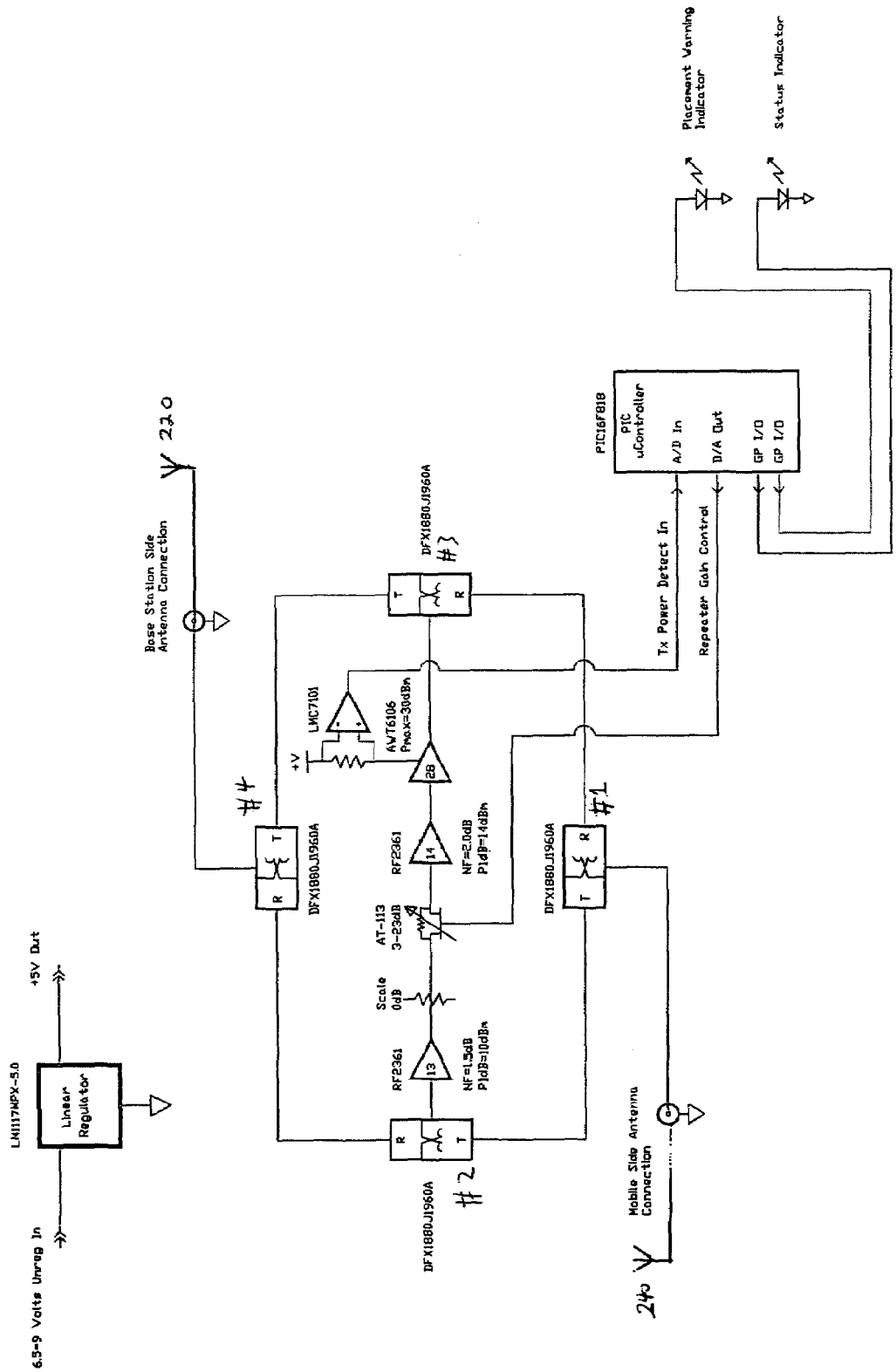
FIG. 7 is a circuit diagram illustrating the repeater.

FIG. 7 is a circuit diagram illustrating the repeater 130. The basic repeater 130 function is to provide the maximum possible bi-directional gain between the repeater's cell phone oriented antenna 240 and the repeater's tower oriented antenna 220. The more stable gain that can be achieved the better the repeater performance. In an embodiment of the invention, for the PCS band the uplink portion covers 1850 MHz to 1910 MHz and the downlink portion covers 1930 MHz to 1990 MHz. In one embodiment, the uplink signal, from the user's phone 140 to the tower 11, flows into the cell phone oriented antenna 240, through the gain stage 230, and out the tower oriented antenna 220. The downlink signal, from the tower 110 to the user's phone 140, flows into the tower oriented antenna 220, through the same gain stage 230, and out the cell phone oriented antenna 240.

Three-port dielectric PCS band duplexers serve to route the uplink and downlink signals through the relevant antenna elements while allowing the gain stages, gain control element, and oscillation detection circuit to be simultaneously shared by both signals. An uplink signal originating from the user's phone 140 enters the phone oriented antenna 240, flows into the common port of duplexer #1 where it is directed via the port labeled 'T' to duplexer #2. From the 'T' port of duplexer #2 the signal is directed to the common port of duplexer #2 where it is amplified and passes into the common port of duplexer #3. From there the signal is directed to the 'T' port of duplexer #3 then flows to the 'T' port of duplexer #4 where it is directed to the common port of duplexer #4 and finally to the tower oriented antenna 220. A downlink signal originating from the tower 110 enters the tower oriented antenna 220, flows into the common port of duplexer #4 where it is directed via the port labeled 'R' to duplexer #2. From the 'R' port of duplexer #2 the signal is directed to the common port of duplexer #2 where it is amplified and passes into the common port of duplexer #3. From there the signal is directed to the 'R' port of duplexer #3 then flows to the 'R' port of duplexer #1 where it is directed to the common port of duplexer #1 and finally to the phone oriented antenna 240.

If an oscillation condition is detected, the PIC16F818 microprocessor based control algorithm (e.g., the gain control system 210) causes the gain to be quickly reduced, by increasing the loss in the AT-113 variable attenuator, until the oscillation ceases. Because the gain control element is common to both the uplink and downlink paths the repeater gain is reduced in both the uplink and downlink directions.

An amplifier AWT6106 is a class A/B amplifier and as such its bias current increases as the RF output power is increased. During an oscillation condition the AWT6106 amplifier is driven to a very high output level causing its bias current to substantially increase. Op-amp LMC7101 is used to measure this bias current and pass this signal to the PIC 16F818 microprocessor where it is analog to digital converted into a digital value for monitoring. If the current passes a pre-determined threshold an oscillation condition is 'declared' for use by the gain control system 210.

All of the repeater circuitry is powered from a regulated voltage provided by linear regulator LM1117. Unregulated power is supplied to LM1117 from an external AC adapter.

The foregoing description of the illustrated embodiments of the present invention is by way of example only, and other variations and modifications of the above-described embodiments and methods are possible in light of the foregoing teaching. For example, repeater 130 can be modified to work with different frequencies besides those of mobile phones and can therefore be used with any type of wireless device. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A wireless communication device repeater, comprising:
   a first antenna that communicates with a first wireless signal source;
   a second antenna that communicates with a second wireless signal source;
   a bi-directional gain stage coupled to the first and second antennas; and
   a gain control system coupled to the gain stage, wherein the gain control system adjusts gain based on oscillation events;
   wherein the gain control system raises the gain when an oscillation event is not detected in a time period.

2. The repeater of claim 1, wherein the first wireless signal source is a cell phone and the second wireless source is a communications tower.

3. The repeater of claim 1, wherein the oscillation events are measured based on RF power levels.

4. The repeater of claim 1, wherein the gain control system lowers the gain when an oscillation event is detected.

5. The repeater of claim 1, wherein the time period is about 10 seconds.

6. The repeater of claim 1, wherein the gain stage amplifies signals received and transmitted from both the first and second antennas.

7. The repeater of claim 1, wherein the first and second antennas have orthogonal polarizations.

8. A method performed by a repeater having a first antenna that communicates with a first wireless signal source; a second antenna that communicates with a second wireless signal source; and a bi-directional gain stage coupled to the first and second antennas, the method comprising:
   determining if an oscillation event has occurred; and
   adjusting the gain of the gain stage based on the determination;
   wherein the adjusting includes raising the gain when an oscillation event is not detected in a time period.

9. The method of claim 8, wherein the first wireless signal source is a cell phone and the second wireless source is a communications tower.

10. The method of claim 8, wherein the determination is based on RF power levels.

11. The method of claim 8, wherein the adjusting includes lowering the gain when an oscillation event is detected.

12. The method of claim 8, wherein the time period is about 10 seconds.

13. The method of claim 8, wherein the gain stage amplifies signals received and transmitted from both the first and second antennas.

14. The method of claim 8, wherein the first and second antennas have orthogonal polarizations.

15. A wireless communication device repeater, comprising:
   a first antenna that communicates with a first wireless signal source;
   a second antenna that communicates with a second wireless signal source;
   a bi-directional gain stage coupled to the first and second antennas; and
   a gain control system coupled to the gain stage, wherein the gain control system adjusts gain based on oscillation events;
   wherein gain control system sets a long term upper gain setting (LTUG) based on the number of oscillation events detected within a time period and wherein the gain control system adjusts gain based on the LTUG.

16. The repeater of claim 15, wherein the first wireless signal source is a cell phone and the second wireless source is a communications tower.

17. The repeater of claim 15, wherein the oscillation events are measured based on RF power levels.

18. The repeater of claim 15, wherein the gain control system lowers the gain when an oscillation event is detected.

19. The repeater of claim 15, wherein the gain stage amplifies signals received and transmitted from both the first and second antennas.

20. The repeater of claim 15, wherein the first and second antennas have orthogonal polarizations.

21. A method performed by a repeater having a first antenna that communicates with a first wireless signal source; a second antenna that communicates with a second wireless signal source; and a bi-directional gain stage coupled to the first and second antennas, the method comprising:
   determining if an oscillation event has occurred;
   adjusting the gain of the gain stage based on the determination; and
   setting a long term upper gain setting (LTUG) based on the number of oscillation events detected within a time period and wherein the adjusting includes adjusting the gain based on the LTUG.

22. The method of claim 21, wherein the first wireless signal source is a cell phone and the second wireless source is a communications tower.

23. The method of claim 21, wherein the determination is based on RF power levels.

24. The method of claim 21, wherein the adjusting includes lowering the gain when an oscillation event is detected.

25. The method of claim 21, wherein the gain stage amplifies signals received and transmitted from both the first and second antennas.

26. The method of claim 21, wherein the first and second antennas have orthogonal polarizations.

* * * * *